(12) United States Patent
Schneider

(10) Patent No.: US 9,703,115 B2
(45) Date of Patent: Jul. 11, 2017

(54) OPTOELECTRONIC APPARATUS AND METHOD OF TAKING AN IMAGE

(71) Applicant: SICK AG, Waldkirch (DE)

(72) Inventor: Florian Schneider, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/657,540

(22) Filed: Mar. 13, 2015

(65) Prior Publication Data

US 2015/0268480 A1  Sep. 24, 2015

(30) Foreign Application Priority Data

Mar. 24, 2014 (DE) .......................... 10 2014 104 026

(51) Int. Cl.
| | | |
|---|---|---|
| G02B 27/64 | (2006.01) | |
| G02B 13/00 | (2006.01) | |
| H04N 5/225 | (2006.01) | |
| G02B 3/14 | (2006.01) | |
| G02B 26/00 | (2006.01) | |
| G06K 7/10 | (2006.01) | |
| G03B 13/36 | (2006.01) | |

(52) U.S. Cl.
CPC ............. *G02B 27/646* (2013.01); *G02B 3/14* (2013.01); *G02B 13/0045* (2013.01); *G02B 26/004* (2013.01); *G02B 26/005* (2013.01); *G03B 13/36* (2013.01); *G06K 7/10831* (2013.01); *G06K 7/10861* (2013.01); *H04N 5/2254* (2013.01)

(58) Field of Classification Search
CPC .... G02B 27/646; G02B 13/0045; G02B 3/14; G02B 26/004; G02B 26/005; H04N 5/2254; G03B 13/36; G06K 7/10861; G06K 7/10831
See application file for complete search history.

(56) References Cited

U.S. PATENT DOCUMENTS

| | | | | |
|---|---|---|---|---|
| 8,245,838 B2 * | 8/2012 | Reichenbach | ............ | B07C 3/14 198/502.1 |
| 2006/0022115 A1 * | 2/2006 | Byren | .................... | G02B 26/06 250/201.9 |
| 2009/0039157 A1 * | 2/2009 | Reichenbach | ..... | G06K 7/10792 235/436 |

(Continued)

FOREIGN PATENT DOCUMENTS

| | | |
|---|---|---|
| DE | 31 36925 A1 | 6/1982 |
| DE | 10 2005 015 500 A1 | 10/2005 |

(Continued)

*Primary Examiner* — Padma Haliyur
(74) *Attorney, Agent, or Firm* — Nath, Goldberg & Meyer; Jerald L. Meyer; Tanya E. Harkins

(57) ABSTRACT

An optoelectronic apparatus (10) is provided in a stationary mounting at a monitored zone (14) with objects (12) to be detected, wherein the apparatus has an image sensor (18) for generating shots of the objects (12); a receiving optics (16) associated with the image sensor (18) and with an adaptive lens (42) having a variable tilt; and an evaluation unit (20) for determining object information from a shot. The evaluation unit (20) is in this respect configured to derive the movement behavior of an object (12) to be taken from an external input signal (28) and to tilt the adaptive lens (42) during a shot of the object (12) such that the movement of the object (12) is compensated.

11 Claims, 3 Drawing Sheets

(56) References Cited

U.S. PATENT DOCUMENTS

Figure 1:
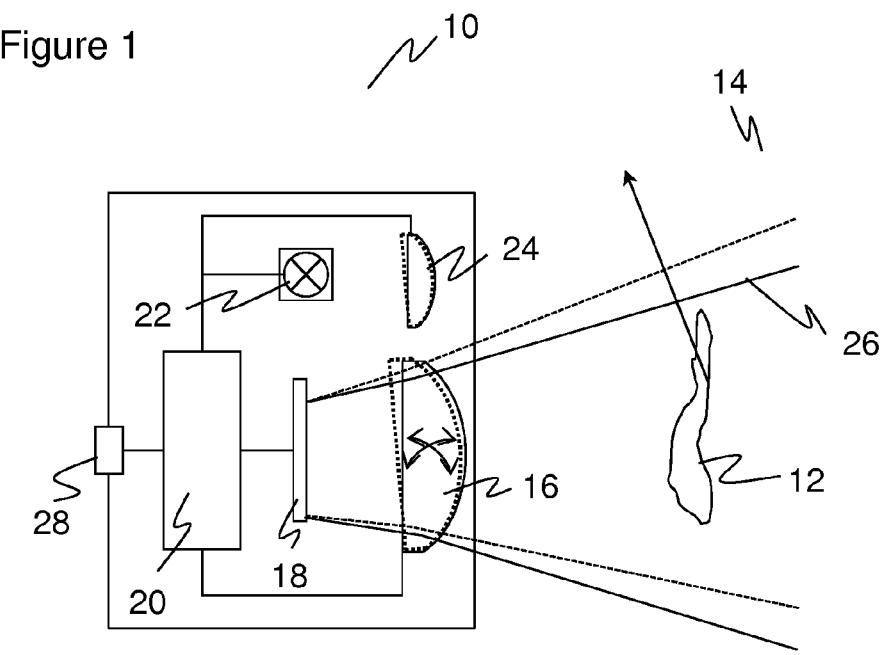

2009/0237517 A1* 9/2009 Lam .................. G03B 5/00
                                               348/208.11
2013/0200157 A1    8/2013 Nunnink
2013/0329094 A1* 12/2013 Ranalli ............... H04N 5/265
                                               348/241

FOREIGN PATENT DOCUMENTS

| DE | 20 2006 017 268 U1 | 4/2008 |
| DE | 202012102669 U1 | 10/2012 |
| DE | 20 2012 105 023 U1 | 3/2013 |
| EP | 2 071 367 A1 | 6/2009 |
| EP | 2 693 363 A1 | 5/2014 |

* cited by examiner

Figure 5a
Figure 5b
Figure 5c
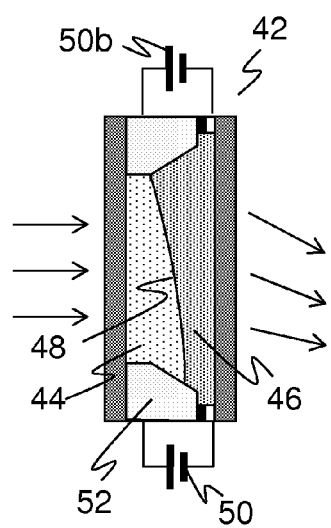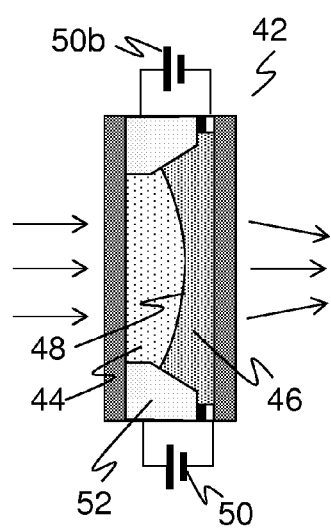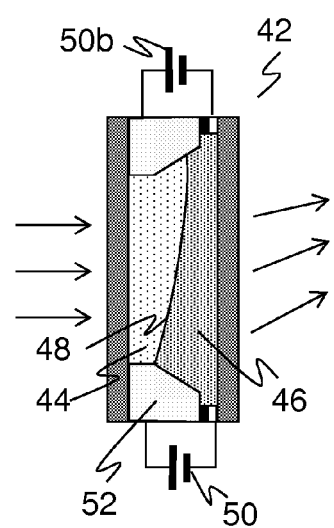
Figure 6
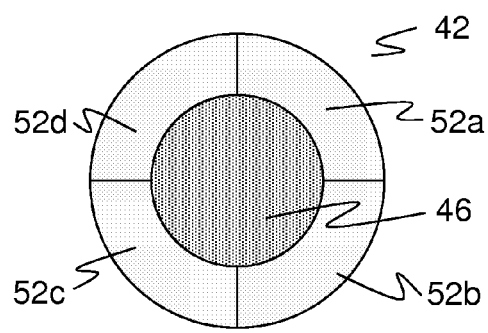

OPTOELECTRONIC APPARATUS AND METHOD OF TAKING AN IMAGE

The invention relates to an optoelectronic apparatus in a stationary mounting and to a method of taking an image of a moved object.

The receiving optics of a camera is focused to a specific distance or distance range with the aid of a focusing adjustment. A known principle electromechanically or optomechanically adjusts the position of the lenses and thus the back focal length of the receiving optics. Such solutions require a lot of construction space and additionally make high demands on the mechanical design for the precise adjustability so that a predefined focal position is also actually adopted. An alternative is the use of optics in which it is not the back focal length which is varied, but rather directly the shape and thus the focal length of the lens itself by means of a voltage control. Gel lenses or liquid lenses are in particular used for this purpose. With a gel lens, a silicone-like liquid is mechanically deformed by means of piezoelectric or inductive actuators. Liquid lenses, for example, utilize the so-called electrowetting effect in that two non-miscible liquids are disposed above one another in a chamber. When a control voltage is applied, the two liquids change their surface tensions in different manners so that the inner boundary surface of the liquids varies its curvature in dependence on the voltage. An electronic sensor having a focus adjustment on the basis of liquid lenses is known from DE 10 2005 015 500 A1 or from DE 20 2006 017 268 U1.

The focusing is, however, only a challenge on the generation of high-quality images which should, for example, be suitable for a reliable automated image evaluation or, even more specifically, for the reading of codes. The interaction of exposure time and available light in particular has a negative effect on the taking of moving objects. For then a compensation of an insufficient illumination of the objects with longer exposure times results in non-focused images due to motion artifacts, that is blurred shots of the objects detected during their movement. The conventional solution comprises using a high-quality and fast lighting to reduce the motion artifacts due to short exposure times. In this respect, the more light is required, the faster the objects move. Such lighting solutions, for example using a plurality of high-power LEDs are, however, expensive and consume a lot of energy. The waste heat thereby also increases and a heating of the camera means increased image sensor noise or a reduction in the quantum yield. The consequence is again a loss of quality of the images and, in the case of camera-based code readers, a reduced reading rate.

In a further development of liquid lenses for focus adjustment, EP 2 071 367 A1 proposes also varying the tilt of the liquid lens by applying different voltages in the peripheral direction. To prevent the taking of blurred images, the camera's own movement is then determined and one or more lenses in the camera are tilted to counteract this movement. In the case of the taking of moving objects, however, the camera's movement is actually not the cause for quality losses of the image. In addition, with a stationary mounting of the camera, such as is customary in a number of industrial applications, this movement is anyway precluded and accordingly also does not have to be compensated.

A further optoelectronic sensor having a liquid lens is disclosed in DE 10 2005 015 500 A1 whose beam shaping properties are asymmetrically variable by an asymmetrical frame or by different electrical potentials at separate electrodes of the lens frame. However, the document does not then explain the purpose for which this can be used.

It is therefore the object of the invention to improve the image quality in objects moving during the shot.

This object is satisfied by an optoelectronic apparatus in a stationary mounting and by a method for taking an image of a moving object. The optoelectronic apparatus in accordance with the invention is fixedly mounted at a monitored zone, that is it is not held by hand so that a camera shake due to a camera movement is precluded from the start. However, the objects to be taken are in motion. The invention starts from the basic idea of obtaining information on this movement as an external input signal and setting an adaptive lens of a receiving optics into a tilt movement on the basis thereof during a shot, said tilt movement compensating the effects of the movement of the objects on the shot. In other words, the apparatus pans its taking range or field of view within the exposure time together with the object, with its movement being derived from the input signal. The image of the object generated by the receiving optics does not move or moves at least as little as possible due to this dynamic tracking. The shot therefore takes place as largely as possible as if the object is stationary.

The external input signal from which the movement behavior of the object and thus the required tilt movement is derived can be a previously input parameter, a dynamic parameter or the constant or time-dependent signal of an external sensor. The evaluation unit then calculates the respective movement of the object.

Alternatively, the movement of the object is already externally determined or calculated and is preset as such.

The invention has the advantage that longer exposure times become possible or that a blur within the exposure time is reduced because the field of view follows the object. Images of substantially higher quality are taken due to the suppression of motion artifacts. In this respect, the design of the apparatus is very compact and inexpensive. The apparatus also becomes very failsafe and low-maintenance due to the dispensing with of moving parts. The adaptive lens allows a tracking of the field of view in a substantially simpler and more compact manner than a mechanically pivotable optical element such as a tilting mirror.

The apparatus preferably has a lighting device for illuminating at least a part of the monitored zone. The power capability of the lighting device can be substantially reduced with respect to otherwise typical lighting since longer exposure times become possible largely without motion artifacts due to the tracking of the field of view or of the taking region. The longer exposure times even allow the dispensing with of a separate lighting in some cases while utilizing only the environmental light.

The lighting device preferably has a transmitting optics with an adaptive lens, wherein the evaluation unit is configured to tilt the adaptive lens during a taking of the object such that the movement of the object is compensated. The adaptive lens of the transmitting optics can be a separate second adaptive lens or the same adaptive lens as that of the receiving optics. In the latter case, the transmitting optics and the receiving optics are then identical. The lighting region is tracked at least substantially synchronously with the field of view by the adaptive lens of the transmitting optics so that the lighting power can be bundled to the respective instantaneous field of view. Alternatively, the transmitting optics does not have an adaptive lens and the lighting region is so large that the field of view remains within the lighting region despite its tracking.

The apparatus is preferably mounted at a conveying system, with the objects to be detected forming an object stream moved by the conveying system. In this case, the conveying system predefines the movement of the objects so that knowledge of the conveying behavior is sufficient to characterize the movement behavior of the objects.

The evaluation unit is preferably configured to guide a viewing field of the image sensor together with the object stream during a shot in that the adaptive lens is co-pivoted at an angular speed corresponding to the movement of the object stream. The adaptive lens is in this respect tilted into a respective starting position for a shot with knowledge of the behavior of the object stream, then co-pivots with the object stream during the exposure time and is subsequently again moved into the starting position for the following shot. The object stream can thus also be detected over a longer time period by shots in which the influence of motion artifacts is suppressed.

The input signal preferably comprises information on the conveying speed of the conveying system. It can be a parameter of a fixed, constant or variable conveying speed which is supplied to the apparatus in advance or during operation. The conveying speed can equally be determined by a sensor in operation, for example by an incremental encoder at a conveyor belt which is connected to the apparatus directly or via a higher-ranking control.

The input signal preferably comprises positional properties and geometrical properties of the objects to be detected. The contour of the objects to be detected is thereby known and can be utilized for a compensating pivot movement of the adaptive lens. In particular a further sensor such as a light grid or a distance-measuring laser scanner is used for the detection.

The input signal preferably comprises distance information of the object to be taken or the apparatus has a distance sensor for determining the distance information, with the evaluation unit being configured to set a focal length of the adaptive lens using the distance signal. The adaptive lens is not only dynamically tilted in this embodiment, but is rather simultaneously brought into the required focal position by adapting the focal length.

The evaluation unit is preferably configured for reading code information from image data taken by the image sensor. The apparatus thus becomes a code reader. Exactly those object surfaces on which codes might be located or on which codes have already been recognized by other sensors can be detected at high resolution, with sufficient exposure and without motion artifacts thanks to the suppression of motion artifacts in accordance with the invention.

The adaptive lens is preferably a liquid lens or a gel lens. Such lenses provide the desired setting possibilities and are very small in construction and inexpensive in this respect. The tilting of such a lens naturally does not necessarily signify a geometrical tilting, but rather relates to the optical effect which effectively corresponds to a tilt.

The adaptive lens preferably has segmented control elements in the peripheral direction. The control elements are, for example, segmented electrodes which control a liquid lens via the electrowetting effect. Segmented actuators, in particular piezo actuators, are furthermore conceivable which locally vary the pressure on a liquid and thereby differently curve a membrane on liquid or which directly deform a gel-like substance of the lens. A non-rotationally symmetrical influencing of the lens which results in the optical tilt is made possible by the segmentation in the peripheral direction.

The method in accordance with the invention can be designed in a similar manner by further features and shows similar advantages in this respect. Such further features are described in an exemplary, but not exclusive manner in the dependent claims following the independent claims.

Figure 2:
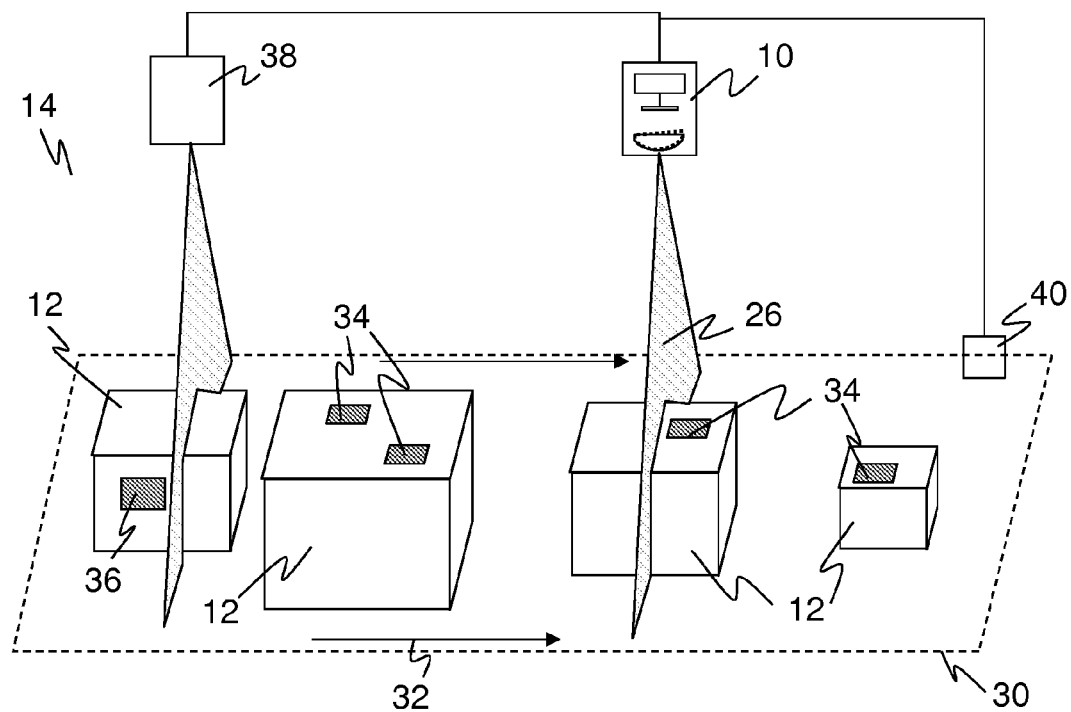
Figure 3A:
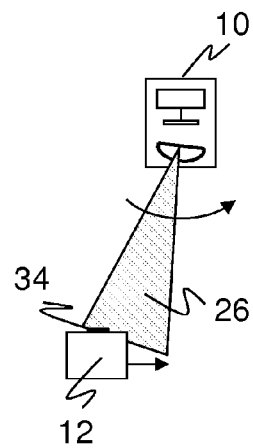
Figure 3B:
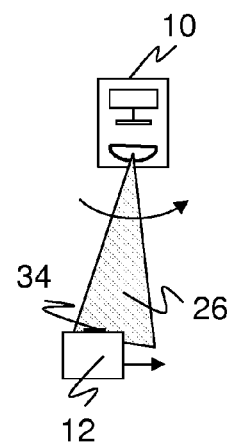
Figure 3C:
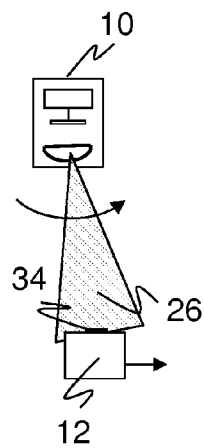
Figure 3D:
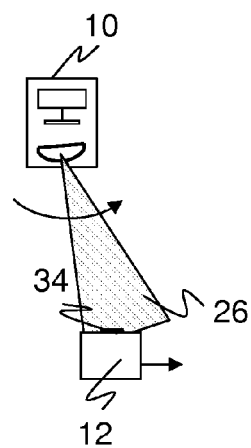
Figure 4A:
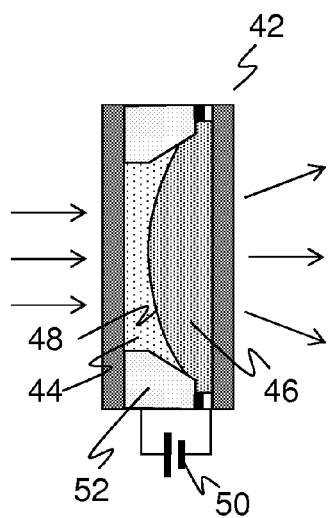
Figure 4B:
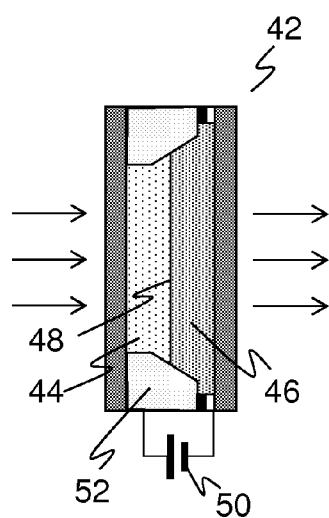
Figure 4C:
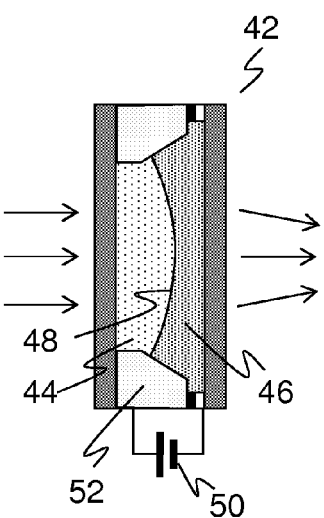

The invention will also be explained in the following with respect to further advantages and features with reference to the enclosed drawing and to embodiments. The Figures of the drawing show in:

FIG. 1 a schematic sectional representation of an optoelectronic apparatus with a light receiver and a tiltable adaptive lens in the receiving optics;

FIG. 2 an overview representation of the exemplary arrangement of an apparatus in accordance with the invention at a conveyor belt;

FIG. 3a-d an illustration of the dynamic tilting of an adaptive lens for guiding the vision field during a shot of a moving object;

FIG. 4a a representation of an adaptive lens in a beam-widening setting:

FIG. 4b a representation of the adaptive lens in a neutral setting:

FIG. 4c a representation of the adaptive lens in a beam-bundling setting:

FIG. 5a a representation of the adaptive lens with a downward tilt;

FIG. 5b a representation of the adaptive lens without a tilt;

FIG. 5c a representation of the adaptive lens with an upward tilt; and

FIG. 6 a plan view of the adaptive lens for illustrating a segmented, non-rotationally symmetrical control.

FIG. 1 shows a schematic sectional representation of an embodiment of an optoelectronic apparatus 10 for taking images of objects 12 which move in a monitored zone 14 as indicated by the arrow. An image sensor 18, for example a CCD or CMOS chip, generates the shots via a receiving optics 18. The image data of these shots are forwarded to an evaluation unit 20. An optional light transmitter 22 with an upstream transmitting optics 24 serves for the active illumination of a taking region or field of view 26 of the apparatus 10. Possible applications of the apparatus 10 are the detection, identification, inspection or measurement of objects. A camera-based code reader arises by the use of signal processing or image processing known per se.

The receiving optics 16 has an adaptive lens which can be tilted by an electronic control of the evaluation unit 20. A variation of the field of view 26 results from the tilting. The functional principle of the adaptive lens will be explained in more detail further below with reference to FIGS. 4 to 6. The receiving optics 16 can have further optical elements, not shown, in addition to the shown adaptive lens, such as lenses, mirrors, diaphragms, filters or a plurality of adaptive lenses.

The possibility of varying the field of view 26 by tilting the adaptive lens is utilized in accordance with the invention to follow the movement of the object 12 during the exposure time to suppress motion artifacts. For this purpose, the apparatus 10 is provided via an input 28 with parameters, signals of external sensors or other information on the movement of the object 12. The evaluation unit 20 determines the required tilt movement from them. The required tilt movement is alternatively predefined directly via the input 28.

The transmitting optics 24 is likewise shown with an adaptive lens in FIG. 1 and is able to move the active lighting field of the light transmitter 22 synchronously with the field of view 26 of the image sensor 16. In an embodiment which is not shown, a rigid transmitting optics can be used instead or the transmission path can be conducted via the receiving optics then co-used as a transmitting optics.

As shown in FIG. 2, the apparatus 10 is mounted as stationary for its operation. In the shown example, the apparatus 10 is mounted above a conveyor belt 30 which conveys objects 12 through the field of view 26 of the apparatus 10, as indicated by the arrow 32. The objects 12 can bear code regions 34 at their outer surfaces. A conceivable object of the apparatus 10, which then works as a camera-based code reader, is the recognition of the code regions 34 and the reading out, decoding and association of the codes located therein with the respective associated object 12. In other applications, different object properties are detected, for example the geometry, type or number of the objects 12.

The code regions 34 can only be recognized by the apparatus 10 when they are applied to the upper side or are at least applied in a manner visible from above. Differing from the representation in FIG. 2, a plurality of apparatus 10 can therefore be mounted from different directions for the detection of a code 36 affixed somewhat to the side or to the bottom in order to permit a so-called omni-detection or omni-reading from all directions. The arrangement of a plurality of apparatus configured as code readers to form a reading system mostly takes place as a reading tunnel in practice.

The field of view 26 of the apparatus 10 is a plane in the example of FIG. 2 and the associated image sensor 18 is thus a linear sensor. A total image of the objects 12 conveyed past, together with the code regions 34, arises gradually in that the objects 12 are taken line-wise in the conveying direction 32. It is, however, alternatively also conceivable to use a matrix sensor as the image sensor 18 which generates a two-dimensional image directly with each shot and not only by assembling a plurality of shots. However, conversely, the assembly to a larger total image is also conceivable with a matrix sensor when the overlap regions of sequential shots are taken into account (image stitching). The field of view 26 toward the conveyor belt 30 can be widened in a similar manner by arranging a plurality of apparatus 10 next to one another.

A further sensor 38, for example a distance measuring laser scanner, is optionally provided with respect to the conveying direction 32 above the apparatus 10 and connected to its input 28. The further sensor 38 detects the height contour of the objects 12 in the course of the conveying movement. This information is forwarded to the apparatus 10. An incremental encoder 40 or another sensor for determining the conveying speed is likewise optionally attached to the conveyor belt 30 and connected to the apparatus 10.

FIG. 3 illustrates in four exemplary steps in time succession the dynamic tilt of the adaptive lens for conducting the visual field 26 during the taking of the moving object 12 to reduce motion artifacts. The evaluation unit 20 has the conveying speed of the objects 12 on the conveyor belt 30 communicated to it from the incremental encoder 40, alternatively as a parameter from another sensor or from a higher-ranking control. The evaluation unit 20 preferably also additionally obtains geometrical data from the further sensor 38, from which geometrical data the object distance can be determined or the object distance is communicated directly via the input 28 or is again alternatively determined by a distance sensor of the apparatus 10 itself. Alternatively, only simplifying assumptions on the object distance are made.

The evaluation unit 20 now determines from the two input values of conveying speed and object distance the required angular speed for a tilt movement of the adaptive lens which has the result that the field of view 26 moves with the image 12. Not only input values but rather the required tilt movement of the adaptive lens can already be predefined via the input 28 here, too. Due to the tilt movement, the image of the image 12 generated by the receiving optics 16 with its dynamically tilted adaptive lens is stationary with respect to the image sensor 18 or its movements are at least considerably reduced. The image taking is therefore also substantially sharper even with long exposure times. The long exposure times conversely allow the power of the light source 22 to be substantially reduced or allow the use of a weaker light source 22 or even of no light source.

The object distance is additionally preferably used to set the focal length of the adaptive lens and thus to focus the receiving optics 16 on the object 12 to be detected during the total shot.

FIGS. 4 and 5 show the adaptive lens of the receiving optics 16 or of the transmitting optics 24 in an exemplary embodiment as a liquid lens 42 after the electrowetting effect. The operation will be explained with reference to this liquid lens, but the invention also covers other adaptive lenses, for example those having a liquid chamber and having a membrane which covers it and whose curvature is varied by pressure on the liquid or having lenses with a gel-like, optically transmitting material which is mechanically deformed by an actuator mechanism.

The actively tunable liquid lens 42 has two transparent, non-miscible liquids 44, 46 having different refractive indices and having the same density. The shape of the liquid-to-liquid boundary layer 48 between the two liquids 44, 46 is used for an optical function. The activation is based on the principle of electrowetting which shows a dependence of the surface tension or of the interface tension on the applied electrical field. It is therefore possible to vary the shape of the boundary layer 44 and thus the optical properties of the liquid lens 42 by an electric control at a terminal 50, whereby corresponding voltages are applied to an electrode 52.

FIG. 4 first shows the longer known variation of the focal properties of the liquid lens 42. In FIG. 4a, incident light is scattered at a concave boundary layer 48. FIG. 4b shows a neutral setting with a flat boundary layer 48, whereas in FIG. 4c, the boundary layer 48 is convex and thus bundles the incident light. It is clear that the refractive behavior can be graduated more finely and a focal length can, for example, be set by corresponding intermediate settings.

The tilt of the liquid lens 42 can, however, also be influenced. This is illustrated in FIG. 5 and is based on non-rotationally symmetrically applied voltages and thus on electrical fields. The boundary layer 48 is accordingly non-rotationally symmetrically deformed, which is utilized for the tilt. FIG. 5a shows a downward tilt of the liquid lens 42; FIG. 5 shows a rotationally symmetrical setting without tilt for comparison; and FIG. 5c shows an upward tilt of the liquid lens 42. In this respect, the direction of the tilt is respectively related to the optical effect, that is from which direction light is received or in which direction transmitted light is transmitted. A focus can in each case be superimposed on the tilt.

FIG. 6 shows a plan view of the liquid lens 42 in order again to explain the non-rotationally symmetrical control. The electrode 52 is segmented for this purpose. At least one additional terminal 50b shown in FIG. 5 can be necessary to control the here exemplary four segments 52a-d. The boundary layer 48 is deformed in a non-rotationally symmetrical manner by application of different voltages and a tilt of the lens shape can therefore be set in addition to the focal length.

The invention claimed is:

1. An optoelectronic apparatus in a stationary mounting and positioned at a monitored zone, the monitored zone comprising moving objects to be detected, the apparatus comprising an image sensor for generating images of the objects; a receiving optics associated with the image sensor and with an adaptive lens comprising a liquid lens or a gel lens and segmented controls, the adaptive lens having a non-rotational and a variable tilt; and an evaluation unit for determining object information from an image;

wherein the evaluation unit is configured to derive the movement behavior of the object from an external input signal comprising input values of a conveying speed and an object distance thereby determining an angular speed for the variable tilt of the adaptive lens in order to move a field of view of the adaptive lens with the image and to tilt the adaptive lens during imaging of the object, thereby compensating for the movement of the object; and wherein the segmented controls comprise segmented electrodes or segmented actuators non-rotationally and symmetrically control the optical tilt of the lens in the peripheral direction.

2. The optoelectronic apparatus in accordance with claim 1, further comprising a lighting device for illuminating at least a part of the monitored zone.

3. The optoelectronic apparatus in accordance with claim 2, wherein the lighting device has a transmitting optics having an adaptive lens; and wherein the evaluation unit is configured to tilt the adaptive lens during a shot of the object such that the movement of the object is compensated.

4. The optoelectronic apparatus in accordance with claim 1, which is mounted at a conveying system, wherein the objects to be detected form an object stream moved by the conveying system.

5. The optoelectronic apparatus in accordance with claim 4, wherein the evaluation unit is configured to guide a viewing field of the image sensor together with the object stream during a shot in that the adaptive lens is co-pivoted at an angular speed corresponding to the movement of the object stream.

6. The optoelectronic apparatus in accordance with claim 4, wherein the input signal comprises information on the conveying speed of the conveying system.

7. The optoelectronic apparatus in accordance with claim 1, wherein the input signal comprises positional properties and geometrical properties of the objects to be detected.

8. The optoelectronic apparatus in accordance with claim 1, wherein the input signal includes distance information of the object to be taken; and wherein the evaluation unit is configured to set a focal length of the adaptive lens with reference to the distance information.

9. The optoelectronic apparatus in accordance with claim 1, further comprising a distance sensor for determining distance information; and wherein the evaluation unit is configured to set a focal length of the adaptive lens with reference to the distance information.

10. The optoelectronic apparatus in accordance with claim 1, wherein the evaluation unit is configured for reading code information from image data taken by the image sensor.

11. A method of taking an image of a moving object using a stationary optoelectronic sensor comprising an image sensor and a receiving optics associated with the image sensor and with an adaptive lens comprising a liquid lens or a gel lens and segmented controls, the adaptive lens having a non-rotational and a variable tilt, the method comprising the steps of:

detecting or predefining the movement behavior of the object; and tilting the adaptive lens during the taking of the image thereby compensating for the movement of the object;

wherein the segmented controls comprise segmented electrodes or segmented actuators non-rotationally and symmetrically control the optical tilt of the lens in the peripheral direction to follow the moving object.

* * * * *